United States Patent [19]

Wakita et al.

[11] Patent Number: 5,011,269

[45] Date of Patent: Apr. 30, 1991

[54] METHOD OF DRIVING A FERROELECTRIC LIQUID CRYSTAL MATRIX PANEL

[75] Inventors: Naohide Wakita, Kobe; Tsuyoshi Uemura, Higashiosaka; Hiroyuki Ohnishi, Ikeda; Noriko Ohba, Nara; Isao Ota, Osaka, all of Japan

[73] Assignee: Matsushita Electric Industrial Co., Ltd., Osaka, Japan

[21] Appl. No.: 903,772

[22] Filed: Sep. 5, 1986

[30] Foreign Application Priority Data

Sep. 6, 1985 [JP] Japan .............................. 60-198014
Sep. 6, 1985 [JP] Japan .............................. 60-198015

[51] Int. Cl.[5] .......................... G02F 1/13; G09G 3/36
[52] U.S. Cl. ............................ 350/350 S; 350/333; 340/784
[58] Field of Search ............... 350/332, 350 S, 333; 340/784, 805, 811, 802

[56] References Cited

U.S. PATENT DOCUMENTS

| | | | |
|---|---|---|---|
| 3,877,017 | 4/1975 | Kawakami et al. | 340/784 |
| 4,227,193 | 10/1980 | Shanks | 350/333 |
| 4,560,982 | 12/1985 | Sonehara et al. | 340/805 |
| 4,591,886 | 5/1986 | Umeda et al. | 350/350 S |
| 4,638,310 | 1/1987 | Ayliffe | 340/805 |
| 4,701,026 | 10/1987 | Yazaki et al. | 350/350 S |
| 4,705,345 | 11/1987 | Ayliffe et al. | 350/333 |
| 4,709,995 | 12/1987 | Kuribayashi et al. | 350/350 S |
| 4,752,774 | 6/1988 | Clerc et al. | 340/784 |

FOREIGN PATENT DOCUMENTS

| | | | |
|---|---|---|---|
| 0149398 | 7/1985 | European Pat. Off. | |
| 0149899 | 7/1985 | European Pat. Off. | |
| 0120328 | 6/1985 | Japan | 350/332 |
| 0156046 | 8/1985 | Japan | 350/332 |
| 0156047 | 8/1985 | Japan | 350/332 |
| 0250332 | 12/1985 | Japan | 350/332 |
| 0173246 | 3/1986 | Japan | 350/332 |

OTHER PUBLICATIONS

T. Harada et al., "An Application of Chiral Smectic-C Liquid Crystal to a Multiplexed Large-Area Display", pp. 131-134—SID International-Symposium Digest of Technical Papers-vol. XVI (May 1, 1985).
T. N. Ruckmongathan—"New Addressing Techniques ... for Multiplexed LCD", pp. 259-262—Proceedings of the SID-vol. 24/3—1983.
E. Kaneko—"Liquid Crystal Television Display", pp. 92-93—SID 78 Digest—Apr. 1978.
"Submicrosecond Bistable Electro-Optic Switching in Liquid Crystals", by N. A. Clark et al., Applied Physics Letters, vol. 36 No. 11 (Jun. 1, 1980), pp. 899-901.
"Fast and Bistable Electro-Optic Displays Using Ferroelectric Liquid Crystals", by N. A. Clark et al., 1984 Eurodisplay, pp. 73-76.

Primary Examiner—Stanley D. Miller
Assistant Examiner—Tai V. Duong
Attorney, Agent, or Firm—Wenderoth, Lind & Ponack

[57] ABSTRACT

A driving method in accordance with the present invention permits the simple time sharing driving of a ferroelectric liquid crystal matrix panel at high scanning frequency and high multiplexing ratio. A predetermined pulse is applied to a scanning electrode when another scanning electrode is selected to reset the pixel. The pixel is inverted or kept by the action of a pulse applied to the pixel when selected and, under this condition, a desired brightness is written in a short scanning period. Besides, the representation of a number of grey levels is obtained by multiple scanning at reset timing varying with the scanning.

2 Claims, 3 Drawing Sheets

METHOD OF DRIVING A FERROELECTRIC LIQUID CRYSTAL MATRIX PANEL

BACKGROUND OF THE INVENTION

1. Field of the Invention

This invention relates to a method of driving a liquid crystal matrix panel having a ferroelectric liquid crystal as a liquid crystal layer.

2. Description of the Prior Art

Recently there has been reports of ferroelectric liquid crystals having a fast response and memory property.

To begin with, a ferroelectric liquid panel known in the prior art will be outlined. A ferroelectric liquid crystal comprises elongated molecules arrayed to form a layer, each being orientated at a specific angle to the layer normal, and has a dipole moment in a perpendicular direction to the longitudinal axis of the molecule and the layer normal. It becomes spontaneously polarized when the layer thickness is made thin. When an electric field is applied to a ferroelectric liquid crystal cell of an extremely small layer thickness, molecules will have two states substantially horizontal to the substrate and orientated at $\pm\theta$ degrees to the layer normal depending on the direction of application of voltage. By the utilization of this phenomenon and, in addition, electro-optic effect such as birefringence or dichroism, light and shade states can be represented. In a sufficiently-thin-layer cell, the interaction between molecules and the substrate surface ensures that the above-mentioned two states are kept after the electric field has been removed. Such a cell is called a "surface stabilized ferroelectric liquid crystal" (SSFLC). (N. A. Clark, et al., "Submicrosecond bistable electro-optic switching in liquid crystals", Applied Physics Letters Vol. 36(11), pp. 899-901, June 1, 1980)

For driving the ferroelectric liquid crystal panel constructed as above, large amplitude pulses having inverse polarity are required when pixels are turned off as well when as turned on, as distinguished from nematic liquid crystals. On the other hand, like nematic liquid crystals, the time average of the applied voltage must be 0 to prevent the liquid crystal from deteriorating. There has been proposed a time-sharing driving method fulfilling these conditions, which is a slightly modified one from the conventional amplitude selection scheme for nematic crystals. (T. Harada, M. Taguchi, K. Iwasa, M. Kai; SID' 85 Digest (1985), p.131). FIG. 1 shows waveforms of voltages applied to the pixel in the conventional driving method. One scanning consists of two frames which are different in polarity, each frame being based on the ¼ amplitude selection scheme. Since an ON-state pixel is written in the first frame and an OFF-state pixel is written in the second frame, in the first frame erroneous overlapped representation of the ON-state pixel at the preceding scanning and new data occurs, and this causes display degradation in the case of longer scanning times or animation. Besides, a frequency of at least 30 Hz is necessary for animation and at least several Hz is necessary for an office automation display. In a ferroelectric liquid crystal, the width of one writing pulse is limited by the response time of the liquid crystal. For these reasons, if one scanning requires a number of frames, as in the prior art, then the number of scanning lines representable within the above-mentioned scanning period become lower.

A ferroelectric liquid crystal can be stable only in three states: two where molecules are horizontal to the substrate and the other where molecules having twisted structure between the upper and lower substrates, and thus countermeasures for representing intermediate grey levels are considered: (a) to utilize the complicated state where two or three of the above-mentioned states are mixed in spots, or (b) to vary relative appearance duration of the two or three states with respect to each other. (N. A. Clark et al., "Fast and bistable electro-optic display using ferroelectric liquid crystals", Eurodisplay pp.73-76, 1984). The state mixed in spots is easily affected by the substrate surface, and so it is difficult for a large size panel to obtain a considerable number of grey levels. The method of varying relative appearance duration is superior from the viewpoint of control, but there has not been any study on time sharing driving methods. Furthermore, for the realization by the time sharing driving method, multiple scanning is considered necessary, and this reflects more strict limitations based on the above-mentioned scanning period.

SUMMARY OF THE INVENTION

In view of the problems stated above, it is a principal object of the invention to provided a method of driving a liquid crystal matrix panel, and more particularly, a simple time-sharing driving method at a high multiplexing ratio and at a high scanning frequency.

The object can be achieved by a method of driving a liquid crystal matrix panel of the type in which ferroelectric liquid crystal is held between scanning electrodes and signal electrodes to form matrix-arrayed pixels, which comprises applying, a first group of pulse voltages to an Nth scanning electrode connected to pixels in an Nth row when pixels in another row are selected, said first group of pulse voltages having enough peak value and pulse width to bring the pixels in the Nth row into a constant state of being either bright or dark so as to thereby reset the pixels in the Nth row; applying, during a selected phase in which the pixels in the Nth row are to be selected, a second group of pulse voltages so that the pixels in the Nth row are either inverted or keep their state in accordance with signal voltages applied to the signal electrodes.

It is preferable that the first pulse voltage group has an absolute value of the peak value and a pulse width, at least one of which is greater than or equal to the corresponding one of those of the second pulse voltage group.

The construction enables the writing of the pixels to be accomplished by only scanning once and in a half time of the prior art. When the first and second pulse voltage groups are properly set, no direct current component is supplied to the pixels and the liquid crystals therefore suffers no deterioration.

Furthermore in the above-mentioned construction, uniform intermediate grey levels even in a large-size panel can be displayed as the result of time modulation by a multiple scanning in which the second pulse voltage group is applied at varying timings.

DESCRIPTION OF THE PREFERRED EMBODIMENTS

Figure 1:
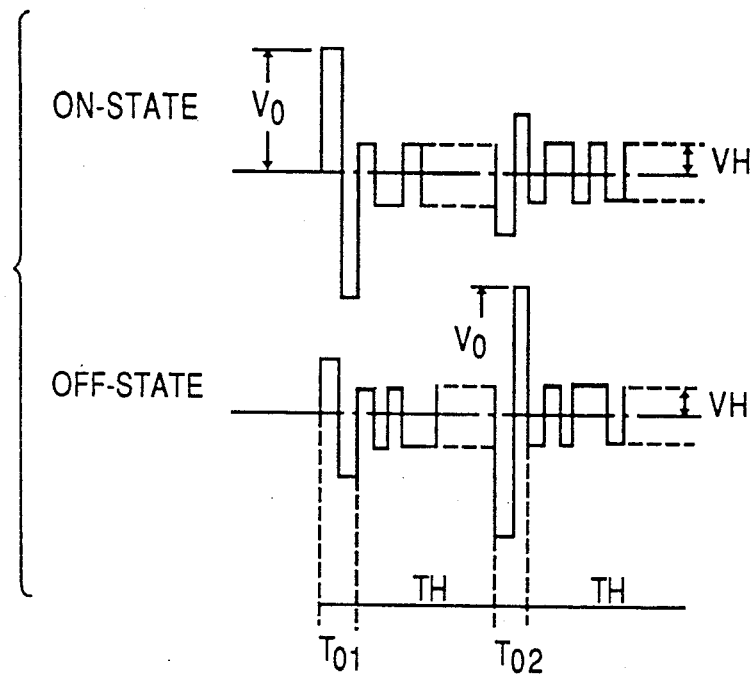
FIG. 1 is a diagram of voltage waveforms illustrative of an example of a driving method in the prior art.
Figure 2:
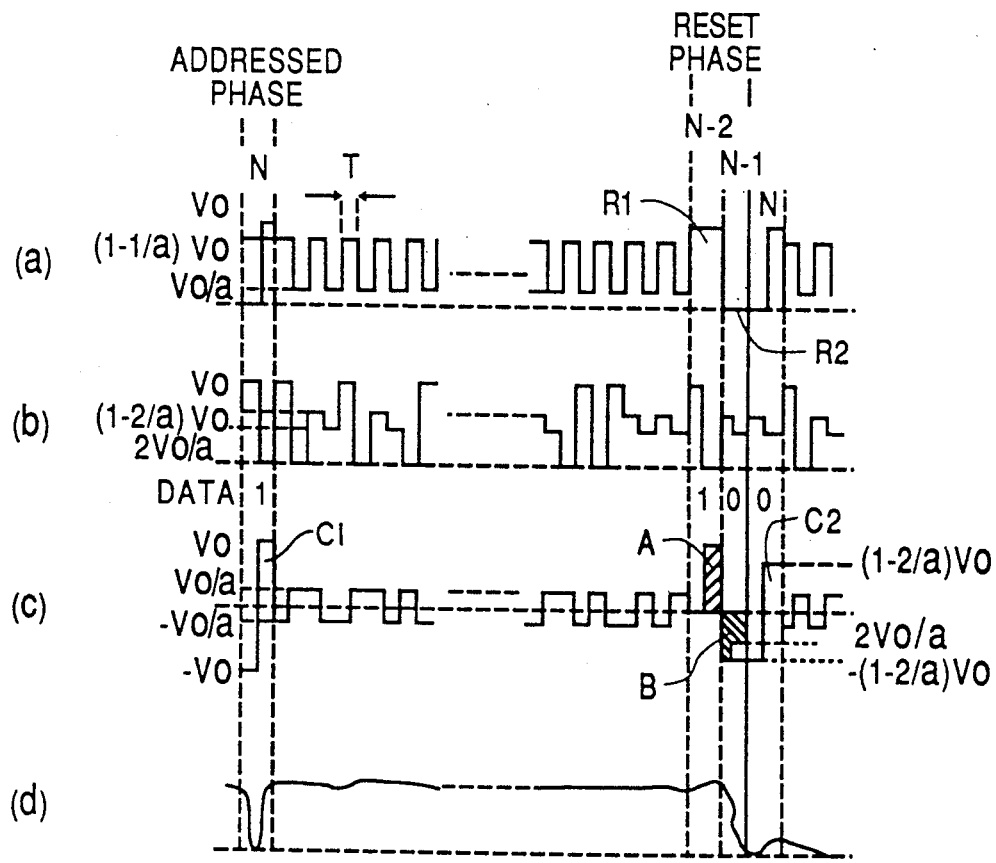
FIGS. 2 through 4 are diagrams of voltage waveforms illustrative of embodiments of the present invention.

FIG. 2 shows drive waveforms of a preferred embodiment of the present invention, in which each abscissa denotes time; waveform (a) shows a voltage applied to scanning electrodes on an Nth row; waveform (b) shows a voltage applied to a signal electrode on an Nth column; waveform (c) shows a voltage applied to the pixel located at a point defined by an Nth row and Mth column and waveform (d) shows a brightness. At the reset phase when the N-1th and N-2th rows are selected, an alternating current pulse having twice in the width and inverse voltage with respect to the scanning voltage at a selected phase N is applied to the scanning electrode at of the Nth row. In the other phases, the conventional amplitude selection scheme is applied. Then, reset pulses A and B are applied to the pixels in the Nth row. The pixels become dark by applying pulse B, and if data of the following selected phase is 1, then pulse $C_1$ having at least the threshold voltage is applied, and the pixels become bright. If the data is 0, the pixels remain dark by the application of pulse $C_2$ which is less than the threshold voltage. A ferroelectric liquid crystal panel has a threshold voltage characteristic which depends on the pulse width. The threshold voltage for the pulse, however, must meet the condition, assuming that Vth and T are the threshold voltage and pulse width, respectively, that $V_0 > V_{th}(T) > (1-2/a)V_0$. Assuming that the negative threshold voltage is the same in absolute value, then pulse B, when the data of the pixel located at the N-1th row and Mth column is 1, has a width T and a voltage $V_0$, and thus, the pixel becomes dark. In FIG. 2, the data at the N-1th and Mth column is 0, and the absolute value of the voltage is less than $(1-2/a)V_0$, but the pulse of the same polarity lasts for 2T, with the result of the drop in the threshold voltage Vth (2T) to about one half of Vth (T). Thus, the reset of the pixel is also possible in this case. Now if data at rows N−1 and N−2 are different from each other, as shown in FIG. 2, the waveforms of pulses A and B are different, and the products of voltage and time are $V_0 \cdot T$ (pulse A), and $$-\left(\frac{2}{a} \cdot V_0 + \left(1 - \frac{2}{a}\right)V_0\right) \cdot T = -V_0 \cdot T \text{ (pulse } B\text{)}$$

Figure 3:
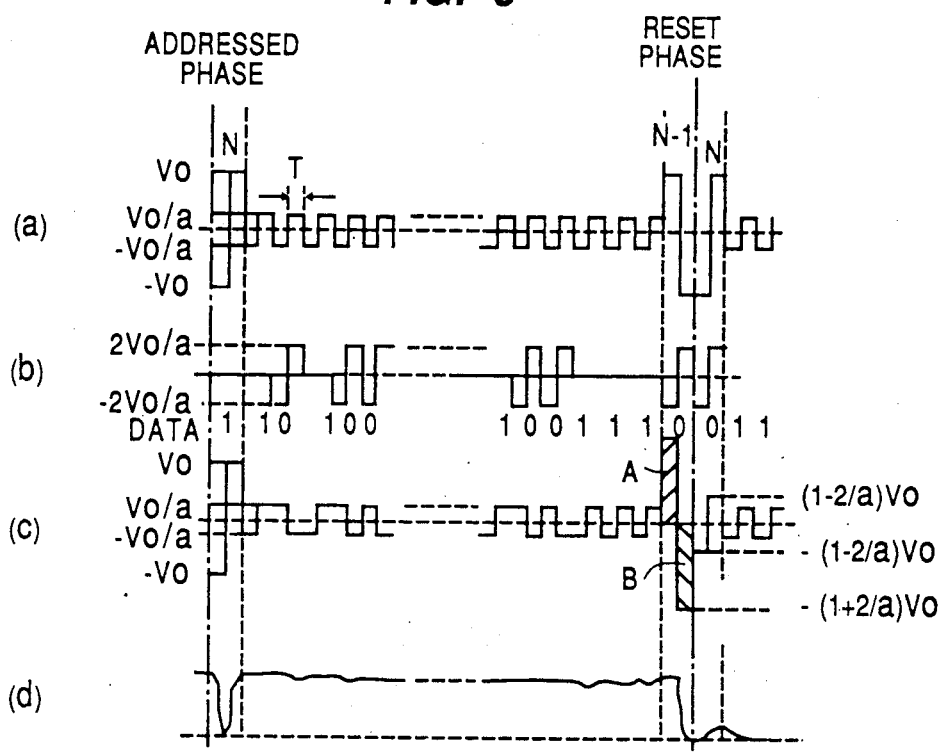

The time average mean voltage is 0 and hence the liquid crystal will undergo no deterioration by electro-chemical reaction. An esteric ferroelectric liquid crystal mixture is placed between a pair of substrates spaced by 2.0 μm and rubbed to be aligned. The thus obtained liquid crystal matrix panel has been driven by the method illustrated in FIG. 2 under the conditions: $V_0=20V$, bias ratio $1/a=1/5$; pulse width=200–300 sec; and duty ratio=1/400; with the result of a display contrast ratio of 7. As above-described, it has been found that the required scanning time (response time of liquid crystal × the number of scanning lines × 2) for the drive was only one half that of the prior art driving method. In addition to the example shown in FIG. 2, the method may be as shown in FIG. 3, the inverse polarity reset pulses A and B to that of the selected phase N is applied to the pixel by applying to the scanning electrode, at phase N-1, a pulse equal in pulse width but different in voltage level compared with those at the selected phase N. In FIG. 3, waveforms (a) and (b) are waveforms of the scanning and signal voltage, respectively, waveform (c) is the voltage applied to a pixel and waveform (d) is the in transmittance.

In the embodiment of FIG. 2, the pulse widths of scanning voltages $R_1$ and $R_2$ at reset phases were twice the pulse width T at the selected phase, but instead, the pulse widths may be more. It can be noted that as long as the pulse widths are integral multiples of T, a direct current component cannot be applied to the liquid crystal. The reset phase may not always be positioned directly before the selected phase. FIGS. 2 and 3 are of only binary notation but it is possible to attach to the signal voltage a grey-level signal in accordance with which a voltage or pulse width is altered. Thus, the examples illustrated in FIGS. 2 and 3 are not limiting the scope of the present invention.

Figure 4:
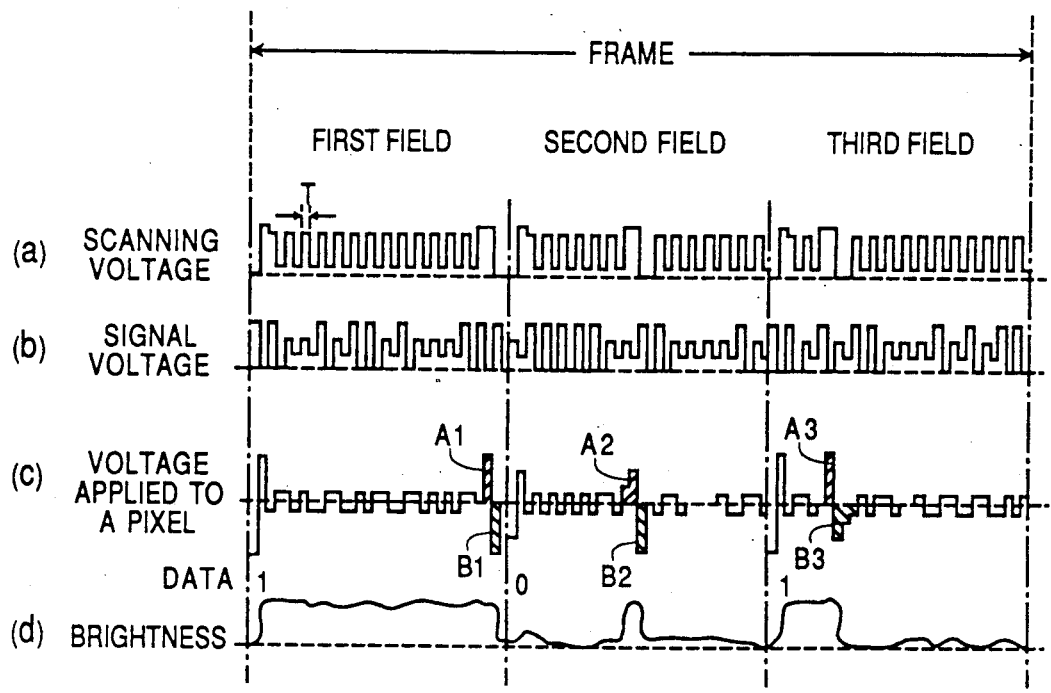

FIG. 4 gives drive waveforms permitting representation of intermediate grey levels, in the cases where pixels themselves can represent binary values and nothing else. The waveforms are obtained by a number of scannings at varying reset phases according to the driving method illustrated in FIG. 2. In FIG. 4, waveforms (a) and (b) show waveforms of scanning and signal voltages; waveform (c) is that of the voltage applied to the pixel, and waveform (d) shows the change in transmittance. The same reset pulses $A_1$, $A_2$, $A_3$; $B_1$, $B_2$, $B_3$ as in FIG. 2 are applied at the final time in the first field, at the middle time in the second field and at the first quarter time in the third field, resulting in the ON-state in each field being limited so as to not continue until directly before the reset phase. Therefore, data of the fields are supplied with weights of $\frac{1}{2}^0$, $\frac{1}{2}^1$ and $\frac{1}{2}^2$, respectively, so that 8 grey levels are represented. FIG. 4 gives the waveforms having realized the display of the grey level of 101 in binary notation. When same waveforms as in FIG. 4 are applied to the same panel as in the example of FIG. 2 under the conditions: the same voltage, and pulse width and bias ratio as in FIG. 2, and a duty ratio 1/50, it was observed that any pixel could uniformly represent 8 grey levels. As described above, the driving method according to the present invention permits a time sharing driving capable of representing intermediate grey levels based on time-modulation, with fields of a finite length in which scanning is repeated a number of times, and thus which is shorter than that in the prior art, reflecting remarkably shortened total scanning time. On the assumption that the number of grey levels is $2^K$, scanning is completed at the Kth field. Taking the number of scanning lines to be N, therefore, it follows that, letting F be one frame time, $$F = K \times N \times 2T.$$

For the display of animation, it is preferable for 1 field to be about 16 msec; therefore, assuming the number of scanning lines is 1000 and the number of grey levels is 64, then the writing time (pulse width of a selected phase) is $$T = F/(K \times N \times 2) = \frac{16 \times 10^{-3}}{6 \times 1000 \times 2} \approx 1.4 \times 10^{-6} \text{ (sec)},$$

which is within the range of realizable values though it is near to the limit of response time of the ferroelectric liquid crystal. When pixels are capable of representing, with good reproducibility, intermediate grey levels, each pixel being in a form having, for example, a having pattern of black and white in spots, consisting of molecules of a twisted structure, or grouping of sub-pixels, and assuming that each pixel itself has m(>3) grey levels, and if the reset phase in the ith field is positioned at $1/m^{k-1}$, then $m^k$ grey levels are representable in the Kth field. This representation alleviates the requirement for fast response of the liquid crystal, and so is easily realizable. The scanning voltage at the reset phase is not necessarily to be of the waveform shown in FIG. 2 but is allowed to have other waveforms, such as that shown in FIG. 3. The position of the reset phase can be suitably changed depending on the contrast of the panel and memory property. Further waveforms other than those at the reset phase are not necessarily based on the amplitude selection scheme, and the driving method in accordance with the invention is not limiting to the waveform shown in FIG. 4.

Figure 5:
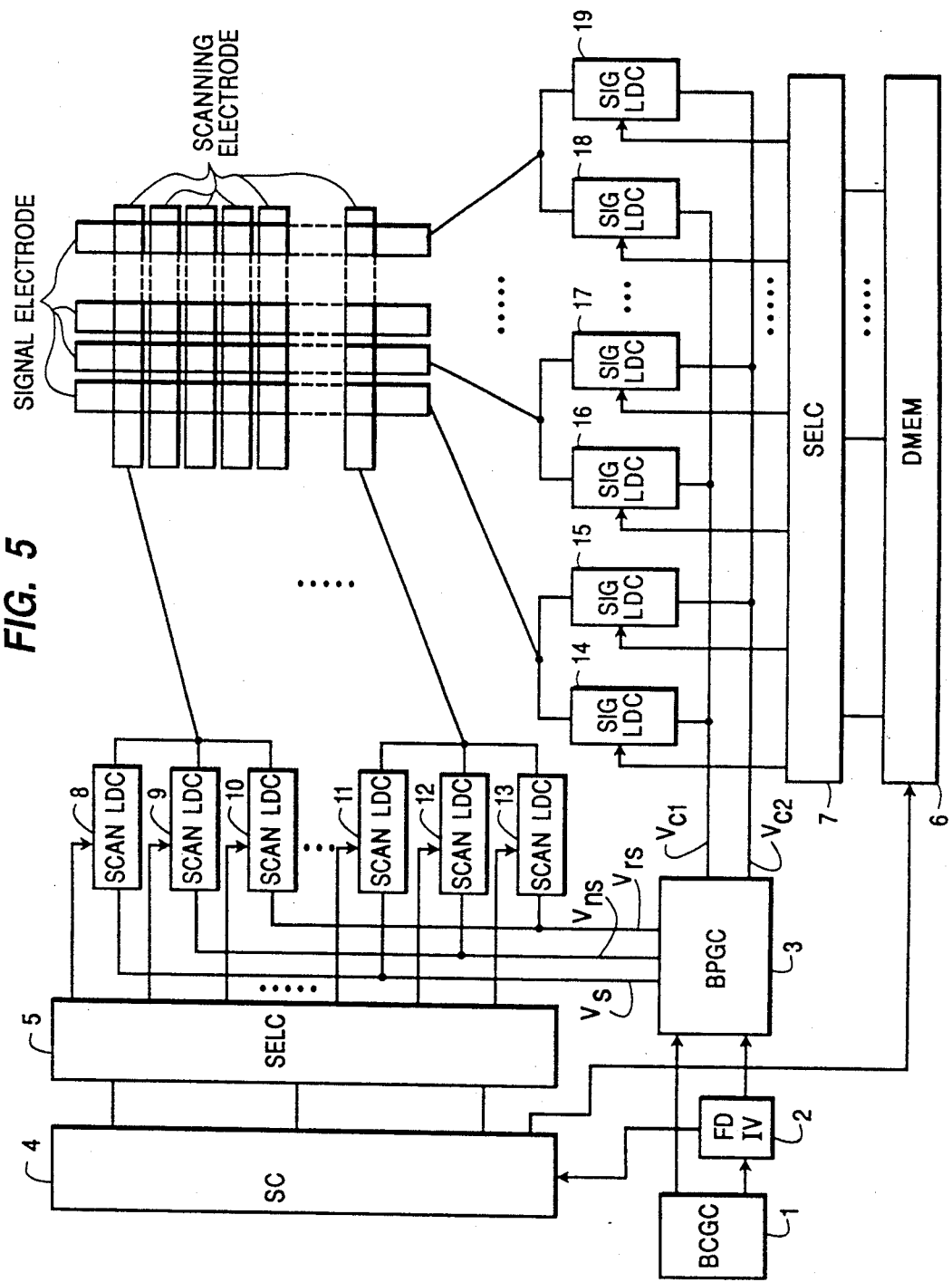
FIG. 5 is a block diagram of display apparatus for performing the driving method according to the present invention.

FIG. 5 is a block diagram of a matrix display apparatus for performing the method according to the present invention, in which clock pulses, which are generated by a base clock generating circuit (BCGC) 1 and frequency-divided by a frequency-divider (FDIV) 2, are applied to a base pulse voltage generating circuit (BPGC) 3. Analog switches in the base pulse voltage generating circuit 3 are turned to generate a selective scanning voltage $V_s$, a non-selective scanning voltage $V_{ns}$, a reset scanning voltage $V_{rs}$, and signal voltages $V_{c1}$ and $V_{c2}$. The scanning circuit (SC) 4 and selective circuit (SELC) 5 supply selective pulses sequentially selected in synchronism with output clock pulses from the divider 2, to scanning line drive circuits (SCANLDC) 8 through 13, which select scanning voltages generated from the base pulse voltage generating circuit 3 in response to the selective pulses. On the other hand, signal line drive circuits (SIGLDC) 14 through 19 select signal voltages in accordance with selective pulses from the selective circuit (SELC) 7, which receives data from a display memory (DMEM) 6.

As set forth above, it has been found according to the present invention that a ferroelectric liquid crystal matrix panel could be driven at high scanning frequencies at high multiplexing ratios. In addition, high frequency waves are conceived superimposed on the scanning voltages at phases other than the reset phase, to make the memory property based on dielectric anisotropy usable. These and other waveforms can be anticipated by those skilled in the art, and the invention is not limiting to the examples described above.

What is claimed is:

1. A method of driving a liquid crystal matrix panel of the type in which ferroelectric liquid crystal is held between scanning electrodes and signal electrodes to form a matrix-arrayed pixels, characterized by: applying a first group of pulse voltages during a reset phase to an Nth scanning electrode connected to pixels in an Nth row when pixels in another row are selected, said first group of pulse voltages having enough peak value and pulse width to bring the pixels in the Nth row into a constant state of either bright or dark, thereby to reset said pixels in said Nth row; and applying, during a selected phase in which the pixels in said Nth row are to be selected, a second group of pulse voltages so that the pixels in said Nth row are either inverted or keep their state in accordance with signal voltages applied to the signal electrodes, wherein one grey-level is obtained by making a multiple number of field scannings while applying said first group of pulse voltages at different timing with each field scanning.

2. A method as claimed in claim 1, wherein, the number of grey-levels each obtainable by a single pixel in one field scanning is an integer K, field scannings are effected n times in each of which the reset phase is taken as generally $1/k^i$ (i=0, 1, ..., n−1) from the start of the field scanning period, and signal voltages each corresponding to the coefficient of $K^i$ of grey level data are applied to the signal electrodes in an ith field scanning, so as to thereby obtain $K^n$ grey levels.

* * * * *